(12) United States Patent
Bretschneider et al.

(10) Patent No.: US 8,322,698 B2
(45) Date of Patent: Dec. 4, 2012

(54) METHOD FOR REDUCING VIBRATIONS OF A MACHINE ELEMENT AND/OR OF A WORKPIECE

(75) Inventors: Jochen Bretschneider, Esslingen (DE); Maximilian Klaus, Stuttgart (DE)

(73) Assignee: Siemens Aktiengesellschaft, München (DE)

( * ) Notice: Subject to any disclaimer, the term of this patent is extended or adjusted under 35 U.S.C. 154(b) by 1164 days.

(21) Appl. No.: 12/095,612

(22) PCT Filed: Nov. 16, 2006

(86) PCT No.: PCT/EP2006/068538
§ 371 (c)(1),
(2), (4) Date: May 30, 2008

(87) PCT Pub. No.: WO2007/062985
PCT Pub. Date: Jun. 7, 2007

(65) Prior Publication Data
US 2010/0164156 A1   Jul. 1, 2010

(30) Foreign Application Priority Data
Nov. 30, 2005   (DE) .......................... 10 2005 057 175

(51) Int. Cl.
*B25B 1/00*   (2006.01)
(52) U.S. Cl. ................. 269/86; 269/88; 269/92
(58) Field of Classification Search ............... 269/86, 269/88, 92
See application file for complete search history.

(56) References Cited

U.S. PATENT DOCUMENTS

| | | | |
|---|---|---|---|
| 4,438,599 A | 3/1984 | Kamman | |
| 4,530,507 A | 7/1985 | Lee, Jr. | |
| 5,140,529 A | 8/1992 | Peifer | |
| 5,143,493 A * | 9/1992 | Najima et al. | 409/141 |
| 5,237,895 A * | 8/1993 | Danielsen | 82/160 |
| 5,957,016 A * | 9/1999 | Segalman et al. | 82/1.11 |
| 7,066,064 B1 * | 6/2006 | Varady | 82/127 |
| 2004/0200327 A1 | 10/2004 | Baker | |
| 2006/0065037 A1 * | 3/2006 | Koppensteiner | 72/420 |

FOREIGN PATENT DOCUMENTS

| | | |
|---|---|---|
| DE | 25 20 946 A1 | 11/1976 |
| DE | 44 05 660 A1 | 8/1995 |
| DE | 198 25 373 A1 | 12/1999 |

(Continued)

OTHER PUBLICATIONS

Hartmut Janocha, Harald Gosebruch: Aktive Dämpfung dynamischer Vorgänge in einer Außenrundschleifmaschine; in: VDI-Zeitschrift 132 (09): Magazine; 1990; DE.

*Primary Examiner* — Lee D Wilson
*Assistant Examiner* — Shantese McDonald
(74) *Attorney, Agent, or Firm* — Henry M. Feiereisen LLC

(57) ABSTRACT

The invention relates to a method for reducing vibrations of a machine element (9) and/or a workpiece (5) in a machine tool, a production machine and/or in a machine which is embodied as a robot. A clamping force (F), which is used to lock the workpiece (5) and which makes the workpiece holder (2a, 2b, 2c, 2d, 2e, 11a, 11b) act upon the workpiece (5), is modified when vibrations occur. The invention also relates to a corresponding machine. Due to said invention, vibrations of a machine element (9) and/or a workpiece (5), which occur during a machining process, are reduced.

11 Claims, 1 Drawing Sheet

FOREIGN PATENT DOCUMENTS

| | | |
|---|---|---|
| DE | 698 04 982 T2 | 11/2002 |
| DE | 102 20 937 A1 | 12/2003 |
| DE | 102 29 134 A1 | 1/2004 |
| JP | 63-109940 | 5/1988 |
| JP | 02-139101 | 5/1990 |
| JP | 11207551 A | 8/1999 |
| JP | 2002039177 A | 2/2002 |
| WO | WO 2005042195 A1 | 5/2005 |

* cited by examiner

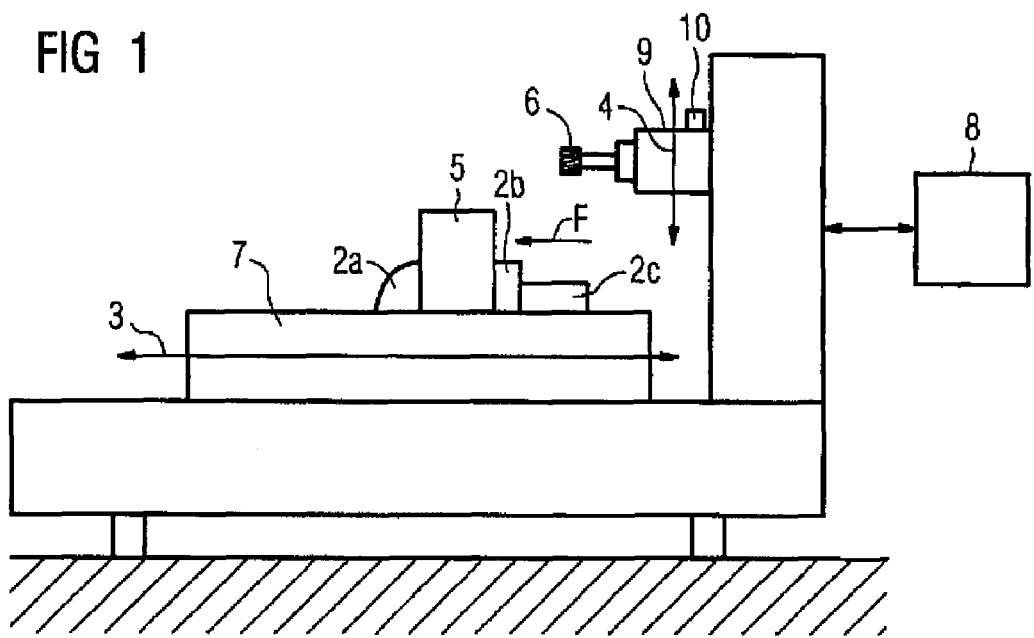
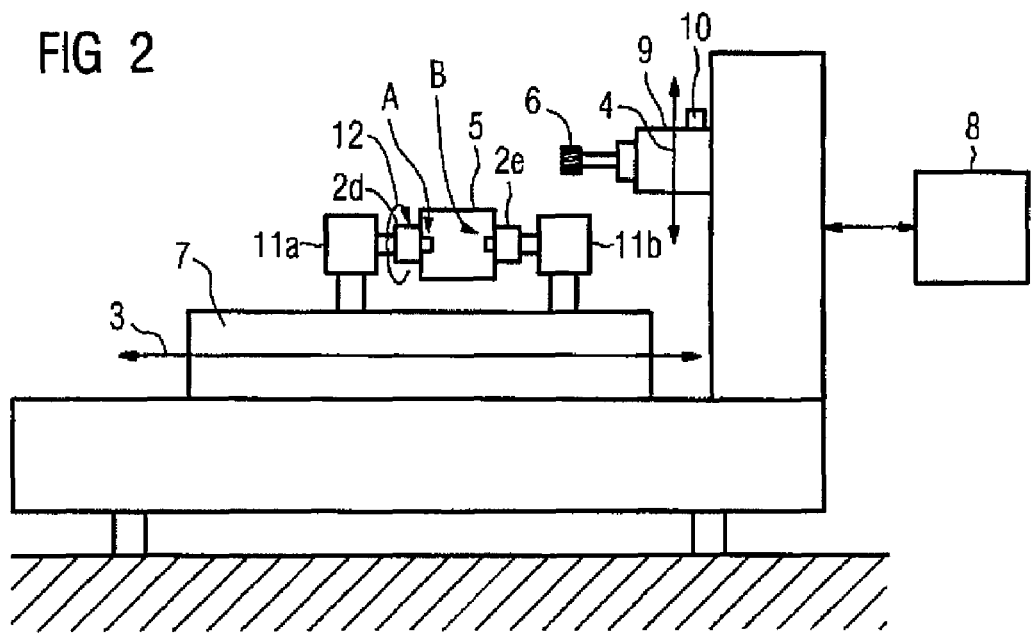

METHOD FOR REDUCING VIBRATIONS OF A MACHINE ELEMENT AND/OR OF A WORKPIECE

BACKGROUND OF THE INVENTION

The invention relates to a method for reducing vibrations of a machine element and/or of a workpiece in a machine tool, production machine and/or in a machine which is embodied as a robot. The invention also relates to a machine of said type.

In machines such as, for example, machine tools, production machines and/or in robots, vibrations often occur during a machining process, which vibrations are generated by the machining process or by a fault, in machine elements of the machine and/or in the workpiece to be machined by the machine. In machine tools in particular, so-called chatter vibrations occur for example during cutting machining processes such as for example turning or milling, which chatter vibrations reduce the machining process quality and the machining speed which can be reached. Chatter vibrations are generated for example if the tool used and/or the workpiece are incited to vibrate at their natural frequency by the forces which occur during the machining process. Occurring vibrations of the tool and/or of the workpiece leave behind a corrugated surface on the workpiece, wherein the corrugated surface can further amplify the vibrations in the event of renewed contact with the tool.

One known measure for reducing vibrations and in particular chatter vibrations is that of the possibility, in the event of vibrations occurring, of reducing the rotational speed with which the tool or the workpiece rotates in the event of the chatter vibrations occurring.

The German laid-open specification DT 25 20 946 A1 discloses a method for preventing or eliminating chatter vibrations of a working spindle of machine tools and a device for carrying out said method.

DE 698 04 982 T2 discloses a device and a method for recommending dynamically preferable machining speeds.

The laid-open specification DE 44 05 660 A1 discloses a method and an arrangement for operating a cutting machine tool, in particular a circular saw, milling or grinding machine or the like.

The laid-open specification DE 102 29 134 A1 discloses a device and a method for workpiece machining using rotating tools, in which, in order to reduce vibrations, a rotating tool is moved dynamically with respect to the driveshaft by means of an adjusting unit which is fitted in a rotating system between the driveshaft and tool.

The laid-open specification DE 198 25 373 A1 discloses a chucking arrangement of a tool in a tool holder, with occurring vibrations being reduced by means of a flexible element which has a high degree of damping and which is inserted into the force flow between the tool and the tool holder.

The laid-open specification DE 102 20 937 A1 discloses a method and a device for damping an occurring chatter vibration in a machining machine.

SUMMARY OF THE INVENTION

The invention is based on the object of reducing vibrations, which occur during a machining process, of a machine element and/or of a workpiece.

Said object is achieved by means of a method for reducing vibrations of a machine element and/or of a workpiece in a machine tool, production machine and/or in a machine which is embodied as a robot, wherein, in the event of the vibrations occurring, a clamping force which is used to lock the workpiece and with which a workpiece holding device acts on the workpiece is varied.

Said object is also achieved by means of a machine, with the machine being embodied as a machine tool, production machine and/or as a robot, with the machine having a workpiece holding device, with the machine being designed such that, in the event of vibrations of a machine element and/or of a workpiece occurring, a clamping force which is used to lock the workpiece and with which the workpiece holding device acts on the workpiece is varied.

Advantageous embodiments of the invention can be gathered from the dependent claims.

Advantageous embodiments of the method are provided analogously to advantageous embodiments of the machine and vice versa.

It has proven to be advantageous if the clamping force is varied by means of a piezo element. The clamping force can be varied in a particularly simple manner by means of a piezo element.

It has also proven to be advantageous if the clamping force is varied by means of a hydraulic element. The clamping force can be varied in a simple manner by means of a hydraulic element.

It has also proven to be advantageous if the clamping force is varied by means of a linear motor. The clamping force can likewise be varied in a simple manner by means of a linear motor.

It has also proven to be advantageous if the clamping force is present in the form of a torsional clamping force which generates a torsional stress in the workpiece. In particular in the case of elongate workpieces, it is possible by introducing a torsional clamping force to obtain particularly good locking of the workpiece.

In this connection, it has proven to be advantageous if the torsional clamping force is generated and varied by means of a rotary drive, since the torsional stress can then be varied in a simple manner.

It has also proven to be advantageous if the torsional clamping force is varied, with the workpiece being clamped into the workpiece holding device at two points of the workpiece and being twisted by means of a rotary drive assigned to each point. By means of said measure, it is possible to obtain particularly good locking of the workpiece, in particular in the case of elongate workpieces, wherein if the workpiece is rotatably clamped into the workpiece holding device at two points, the workpiece can be rotated during the machining process, but by means of corresponding activation of the two drives, the torsional clamping force is maintained and can be varied.

In this connection, it has proven to be advantageous if the rotary drive is embodied as a direct drive. Said measure permits a simple construction of the workpiece holding device.

It has also proven to be advantageous if the clamping force is composed of a linear clamping force and a torsional clamping force, with the linear clamping force being varied by means of a piezo element, a hydraulic element and/or a linear motor, and the torsional clamping force being varied by means of a rotary drive, with it being possible for the rotary drive to be embodied as a direct drive.

It has also proven to be advantageous if the occurrence of vibrations is determined by virtue of the signal of a vibration sensor being monitored and/or by virtue of a drive variable being monitored. The use of vibration sensors and/or monitoring a drive variable, such as for example a drive current, represent simple possibilities for determining occurring vibrations.

It has also proven to be advantageous if the clamping force is varied until the amplitudes of the vibrations are at a minimum. The occurring vibrations can be minimized by means of said measure.

BRIEF DESCRIPTION OF THE DRAWING

Two exemplary embodiments of the invention are illustrated in the drawing and are explained in more detail below. In the drawing:

FIG. 1 shows a machine according to the invention and
FIG. 2 shows a further machine according to the invention.

DETAILED DESCRIPTION OF PREFERRED EMBODIMENTS

FIG. 1 illustrates, in the form of a schematic illustration, a machine 1 which is embodied as a machine tool within the context of the exemplary embodiment. The machine 1 has a displaceable drive 9 for driving a tool 6 in rotation, with the drive 9 being displaceable in the vertical direction, as indicated by an arrow 4.

The machine 1 also has a workpiece carriage 7 which is displaceable in the direction of the arrow 3 and on which a workpiece 5 to be machined is locked by means of a workpiece holding device. Within the context of the exemplary embodiment, the workpiece holding device comprises a first clamping jaw 2a which is fixedly connected to the workpiece carriage 7, a second clamping jaw 2b which is arranged so as to be movable on the workpiece carriage 7 in the horizontal direction, and a force element 2c which generates a clamping force F. The force element 2c exerts a clamping force F on the second clamping jaw 2b and presses the latter against the workpiece, such that the workpiece 5 is thereby locked. Furthermore, the machine has a vibration sensor 10 in order to determine occurring vibrations, in particular chatter vibrations on a machine element which is embodied within the context of the exemplary embodiment as a drive 9. Furthermore, the machine 1 has a control and/or regulating device 8 for controlling and/or regulating the machine 1. Within the context of the exemplary embodiment, the tool 6 is embodied as a milling cutter.

Now, if vibrations, in particular chatter vibrations, occur during the machining process, that is to say in this case during the milling process, then said vibrations are detected by the vibration sensor 10 and a corresponding vibration signal is supplied to the control and/or regulating device 8. According to the invention, in order to reduce vibrations which occur during the machining process, the clamping force F which is used for locking the workpiece 5 and with which the workpiece holding device acts on the workpiece is varied by virtue of the clamping force F being increased or decreased. This takes place by means of the force element 2c which can for example be embodied as a hydraulic element or as a linear motor. However, the force element 2c can also, for variations in the clamping force, have a piezo element or be embodied as a piezo element, by means of which the clamping force F can be varied. By means of the control and/or regulating device 8, the variation of the clamping force F is controlled by virtue of the force element 2c being correspondingly activated. Here, it is advantageous for the clamping force F to be varied within permissible and possible limits until the amplitudes of the vibrations are at a minimum.

It is of course also conceivable for the force element to be formed from a combination of a linear motor and/or hydraulic element and/or piezo element.

The vibration sensor 10 can of course also be attached in the vicinity of the workpiece and thereby detect vibrations occurring in the workpiece. Alternatively or in addition, occurring vibrations can however also be determined by monitoring the drive currents of the drive 9 or of the drive, which has not been illustrated in FIG. 1 for clarity, of the workpiece carriage 3.

The embodiment illustrated in FIG. 2 substantially corresponds in terms of its basic design to the above embodiment described in FIG. 1. Identical elements are therefore provided with the same reference symbols in FIG. 2 as in FIG. 1. The significant difference of the embodiment as per FIG. 2 in relation to the embodiment as per FIG. 1 is that the tool holding device is designed such that the clamping force which acts on the workpiece and which is varied is present in the form of a torsional clamping force which generates a torsional stress in the workpiece. For this purpose, the workpiece holding device as per FIG. 2 has two rotary drives 11a and 11b, with the rotary drive 11a driving a clamping jaw 2d in rotation and the rotary drive 11b driving a further clamping jaw 2e in rotation. The workpiece is clamped into the workpiece holding device at the points A and B, wherein in order to lock the workpiece, a torsional clamping force is generated by virtue of the workpiece 5 being twisted by means of the rotary drives 11a and 11b.

In the exemplary embodiment, the drive 11b is activated in such a way that the latter maintains its position, while the drive 11a is rotated by a small angle, as indicated by an arrow 12, in order to generate a torsional stress in the workpiece. In contrast to the embodiment as per FIG. 1, therefore, inter alia a torsional clamping force is used for locking the workpiece in the embodiment as per FIG. 2. If vibrations occur in a machine element and/or in the workpiece during the milling process of the workpiece, then the torsional clamping force generated by the drive 11a is varied and the vibrations are thereby reduced. The embodiment as per FIG. 2 is advantageous in particular in the case of an elongate workpiece which, if no locking of the workpiece by means of a torsional clamping force is carried out, cannot be correctly locked since it otherwise starts to bend under the forces which act during the machining process.

The embodiment of the workpiece holding device illustrated in FIG. 2 also offers the advantage that, during the machining process, the workpiece can be rotated by means of the two drives 11a and 11b in the same direction, but with the drives 11a and 11b being activated in such a way that the torsional clamping force is maintained during the rotary movement and can be varied in the event of vibrations occurring.

The drives 11a and 11b are embodied in the exemplary embodiment as direct drives, in particular as torque motors, which permits a simple structural mechanical design of the workpiece holding device.

it is of course also possible for the torsional clamping force to be varied by means of only one single rotary drive by virtue, for example, of the drive 11b being omitted and the clamping jaw 2e being positionally fixedly connected to the workpiece carriage 7.

In the embodiment as per FIG. 1, the clamping force F is present in the form of a linear clamping force which acts on the workpiece in a linear direction, while in the embodiment as per FIG. 2, the clamping force is present in the form of a torsional clamping force which generates a torsional stress in the workpiece. It is of course also possible for the two embodiments to be combined, with the clamping force in this case being composed of a linear clamping force and a torsional clamping force, with it being possible for the drive 11a as per FIG. 2 to also exert a linear clamping force on the workpiece 5 in the linear direction, for example by means of a suitable hydraulic element as used in FIG. 1.

As a result of the reduction of the vibrations, the machining speed and the feed depth into the material can be increased, as a result of which an increase in productivity can be obtained and/or the machining quality can be improved.

It should be noted at this point that, within the context of the invention, for example a tool which is clamped into the machine is also considered to be a machine element.

What is claimed is:

1. A method for reducing vibrations of a workpiece in a machine, comprising the step of:
   varying, in the presence of vibrations, a torsional clamping force which locks the workpiece via a workpiece holding device, wherein the torsional clamping force generates a torsional stress in the workpiece,
   determining presence of vibrations in the workpiece and generating a vibration signal in response to the presence of vibrations,
   transmitting the vibration signal to a controller, and
   adjusting the torsional clamping force during operation of the machine until amplitudes of the vibrations are at a minimum.

2. The method of claim 1, wherein the machine is selected from the group consisting of machine tool, production machine, and robot.

3. The method of claim 1, wherein the torsional clamping force is varied by means of a rotary drive.

4. The method of claim 1, wherein the torsional clamping force is varied by clamping the workpiece in the workpiece holding device at two points of the workpiece, and by twisting the workpiece by rotary drives assigned to the points in one-to-one correspondence.

5. The method of claim 4, wherein each of the rotary drives is embodied as a direct drive.

6. The method of claim 1, wherein the clamping force is composed of a linear clamping force and the torsional clamping force, said varying step including the step of varying the linear clamping force by a member selected from the group consisting of piezo element, hydraulic element, and linear motor, and varying the torsional clamping force by clamping the workpiece in the workpiece holding device at two opposing points of the workpiece, and twisting the workpiece by rotary drives assigned to the points in one-to-one correspondence.

7. The method of claim 1, wherein the signal is generated by a vibration sensor.

8. The method of claim 1, further comprising the step of monitoring a drive variable to determine the presence of vibrations.

9. A machine, comprising:
   a workpiece holding device for locking a workpiece in place by a torsional clamping force;
   adjustment means embodied as a rotary drive operatively connected to the workpiece holding device for varying the torsional clamping force in the presence of vibrations;
   a control unit operatively connected to the adjustment means, and
   a vibration sensor rendered operative in response to the presence of vibrations for transmitting a signal to the control unit.

10. The machine of claim 9, constructed in the form of a member selected from the group consisting of machine tool, production machine, and robot.

11. The machine of claim 9, wherein the workpiece holding device clamps the workpiece at two points of the workpiece, and further comprising rotary drives assigned to the points in one-to-one correspondence for twisting the workpiece and thereby applying the torsional clamping force.

* * * * *